United States Patent
Carr et al.

(10) Patent No.: US 10,074,033 B2
(45) Date of Patent: Sep. 11, 2018

(54) USING LABELS TO TRACK HIGH-FREQUENCY OFFSETS FOR PATCH-MATCHING ALGORITHMS

(71) Applicant: Adobe Systems Incorporated, San Jose, CA (US)

(72) Inventors: Nathan Carr, San Jose, CA (US); Kalyan Sunkavalli, San Jose, CA (US); Michal Lukac, San Jose, CA (US); Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 110 days.

(21) Appl. No.: 15/286,905

(22) Filed: Oct. 6, 2016

(65) Prior Publication Data
US 2018/0101942 A1   Apr. 12, 2018

(51) Int. Cl.
*G06T 7/00* (2017.01)
*G06K 9/38* (2006.01)
*G06K 9/62* (2006.01)

(52) U.S. Cl.
CPC .............. *G06K 9/621* (2013.01); *G06K 9/38* (2013.01); *G06T 7/003* (2013.01); *G06K 2009/6213* (2013.01)

(58) Field of Classification Search
CPC .. G06K 9/66; G06K 2009/6213; G06K 9/621; G06K 9/38; G06T 7/003
See application file for complete search history.

(56) References Cited

U.S. PATENT DOCUMENTS

| 8,285,055 | B1   | 10/2012 | Barnes et al. |
| 8,811,749 | B1 * | 8/2014  | Barnes .................... G06T 7/337 382/108 |
| 2015/0324965 | A1 * | 11/2015 | Kulkarni .................. G06T 7/74 382/144 |

OTHER PUBLICATIONS

Connelly Barnes, et al., "The Generalized PatchMatch Correspondence Algorithm", Computer Vision—ECCV, vol. 6313 Series Lecture Notes in Computer Science, 2010, 14 pages.
(Continued)

*Primary Examiner* — Bobbak Safaipour
(74) *Attorney, Agent, or Firm* — Kilpatrick Townsend & Stockton LLP

(57) ABSTRACT

Certain embodiments involve using labels to track high-frequency offsets for patch-matching. For example, a processor identifies an offset between a first source image patch and a first target image patch. If the first source image patch and the first target image patch are sufficiently similar, the processor updates a data structure to include a label specifying the offset. The processor associates, via the data structure, the first source image patch with the label. The processor subsequently selects certain high-frequency offsets, including the identified offset, from frequently occurring offsets in the data structure. The processor uses these offsets to identify a second target image patch, which is located at the identified offset from a second source image patch. The processor associates, via the data structure, the second source image patch with the identified offset based on a sufficient similarity between the second source image patch and the second target image patch.

20 Claims, 6 Drawing Sheets

(56) References Cited

OTHER PUBLICATIONS

Kaiming He, et al., "Statistics of Patch Offsets for Image Completion", Computer Vision—ECCV, vol. 7573 Series Lecture Notes in Computer Science, 2012, 14 pages.
Connelly Barnes, et al., "PatchMatch: A Randomized Correspondence Algorithm for Structural Image Editing", ACM Transactions on Graphics—TOG 28.3, 2009, 10 pages.

* cited by examiner

USING LABELS TO TRACK HIGH-FREQUENCY OFFSETS FOR PATCH-MATCHING ALGORITHMS

TECHNICAL FIELD

This disclosure relate generally to the field of image processing, and more specifically relates to using labels to track high-frequency offsets for patch-matching algorithms and thereby improve the propagation of offsets through a source image during execution of a patch-matching algorithm.

BACKGROUND

Certain types of digital image processing invoke identifying sufficiently similar patches in two different image regions (e.g., two different or two different regions of the same image). In one example, a similarity between two image patches is evaluated based on a metric indicating a patch distance, wherein one of the image patches is selected from a source image region and the other image patch is selected from a target image region. For instance, the pixel values in the two patches may be represented as vectors, and a similarity score is laced based on a similarity between the vectors. An example of a similarity score is a sum-of-square distances between pixel values in the patches, where patches with identical image content will be at a distance of zero. Identifying these similarities between source image patches and target image patches allows the target images to be used for manipulating the source image. Examples of these manipulations include image in-painting, stereo matching, and texture synthesis.

Some image manipulation applications use one or more patch-matching algorithms to find similarities between source image patches and target image patches. A patch-matching algorithm identifies correspondences between source image patches and sufficiently similar target image patches using offset vectors. For example, the patch-matching algorithm generates at least one transform that maps a given source image patch to a corresponding target image patch. The offset vector identifies an offset from the source image patch to a target image patch that is sufficiently similar to the source image patch. In one example, a source image patch in the source image region is defined using pixel coordinates S(i,j), which indicates that the source image patch has its center (or some other reference point) at column i and row j of the pixels in the source image region S. A target image patch in the target image region T is similarly defined using pixel coordinates T(k,l), which indicates that the target image patch has its center (or some other reference point) at column k and row l of the pixels in the target image region T. A transformation of S to T is represented using an offset vector O between patches S(i,j) and T(k,l), where the offset vector is defined as O=(k−i,l−j).

In certain patch-matching algorithms, an offset vector for a first source image patch is propagated to a neighboring source image patch. The propagation is performed due to the likelihood of adjacent patches in the source image being sufficiently similar to adjacent patches in the target image. For example, a source image patch and its neighboring source image patches may depict a brick wall. A patch-matching algorithm, when attempting to find a sufficiently similar target image patch for the source image patch, identifies an offset vector (e.g., a vector of (5, 5)) that has already been determined for the neighboring source image patch. A target image with one image patch depicting a brick wall is likely to have an adjacent image patch depicting a brick wall. To take advantage of this circumstance, the patch-matching algorithm searches for a target image patch that is offset from the source image patch by the same offset vector (e.g., a target image patch five pixels up and five pixels right from the source image patch) that was determined for the neighboring source image patch.

In some cases, the target image patch identified via the offset may not be sufficiently similar to the source image patch. For example, the offset may identify a target image patch that depicts a window instead of a brick wall. In this case, the patch-matching algorithm continues searching for a more similar target image patch.

Relying on the propagation of offset vectors from neighboring patches may cause processing inefficiencies. For instance, nearest-neighbor propagation may be sub-optimal for propagating offsets through a source image that includes occluding objects, which hinder the propagation. In a simplified example, a source image region depicts a brick wall with a lamp post (i.e., an occluding object) in the middle of the wall, and a target image region depicts a similar brick wall without a lamp post. The source image region includes a first "brick wall" image patch depicting a portion of the brick wall on one side of the lamp post, a "lamp post" image patch depicting a portion of the lamp post, and a second "brick wall" image patch depicting a portion of the brick wall on another side of the lamp post.

In this example, the same offset vector (e.g., a "brick wall" offset of (5, 5)) would allow sufficiently similar target image patches to be found for both the first "brick wall" image patch and the second "brick wall" image patch. But the "brick wall" offset does not allow a sufficiently similar target image patch to be found for the "lamp post" image patch. For instance, moving five pixels up and five pixels right from the lamp post may select a target image patch depicting the brick wall rather than an image patch that is similar to the "lamp post" image patch. The patch-matching algorithm would therefore select some other offset vector (e.g., a "lamp post" offset of (11, 11)) that locates a sufficiently similar target image patch for the "lamp post" image patch.

Since the "lamp post" image patch is a neighbor of the second "brick wall" image patch, the "lamp post" offset, rather than the "brick wall" offset, will be propagated to the second "brick wall" image patch even if the "brick wall" offset would locate a more similar target image patch for the second "brick wall" image patch. The "lamp post" offset will not locate a target image patch that is sufficiently similar to the second "brick wall" image patch. Therefore, the patch-matching algorithm continues searching for a more similar target image patch and thereby re-creates the "brick wall" offset that would have been propagated between the first and second "brick wall" patches if the "lamp post" image patch had not been positioned between them. In this manner, the lamp post's image patch occludes the "brick wall" offset from being propagated between the two "brick wall" patches. Thus, the patch-matching algorithm must expend processing resources on re-creating the same "brick wall offset" for both of the "brick wall" patches. The processing resources being expended can increase further if additional search techniques, such as image patch rotations and changes in scale, increase the dimensionality of the search space of target image patches.

Thus, existing patch-matching algorithms may present computationally inefficiencies for reasons such as (but not limited to) those described above.

SUMMARY

Certain embodiments involve using labels to track high-frequency offsets for patch-matching algorithms. In some embodiments, a processor identifies an offset between a first source image patch and a first target image patch. If the first source image patch and the first target image patch are sufficiently similar, the processor updates a data structure to include a label specifying the identified offset. The processor associates, via the data structure, the first source image patch with the label. The processor subsequently selects certain high-frequency offsets, including the identified offset, from frequently occurring offsets identified in the data structure. The processor uses the selected offsets to identify a second target image patch, which is located at the identified offset from a second source image patch. The processor associates, via the data structure, the second source image patch with the identified offset based on the second source image patch and the second target image patch being sufficiently similar.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
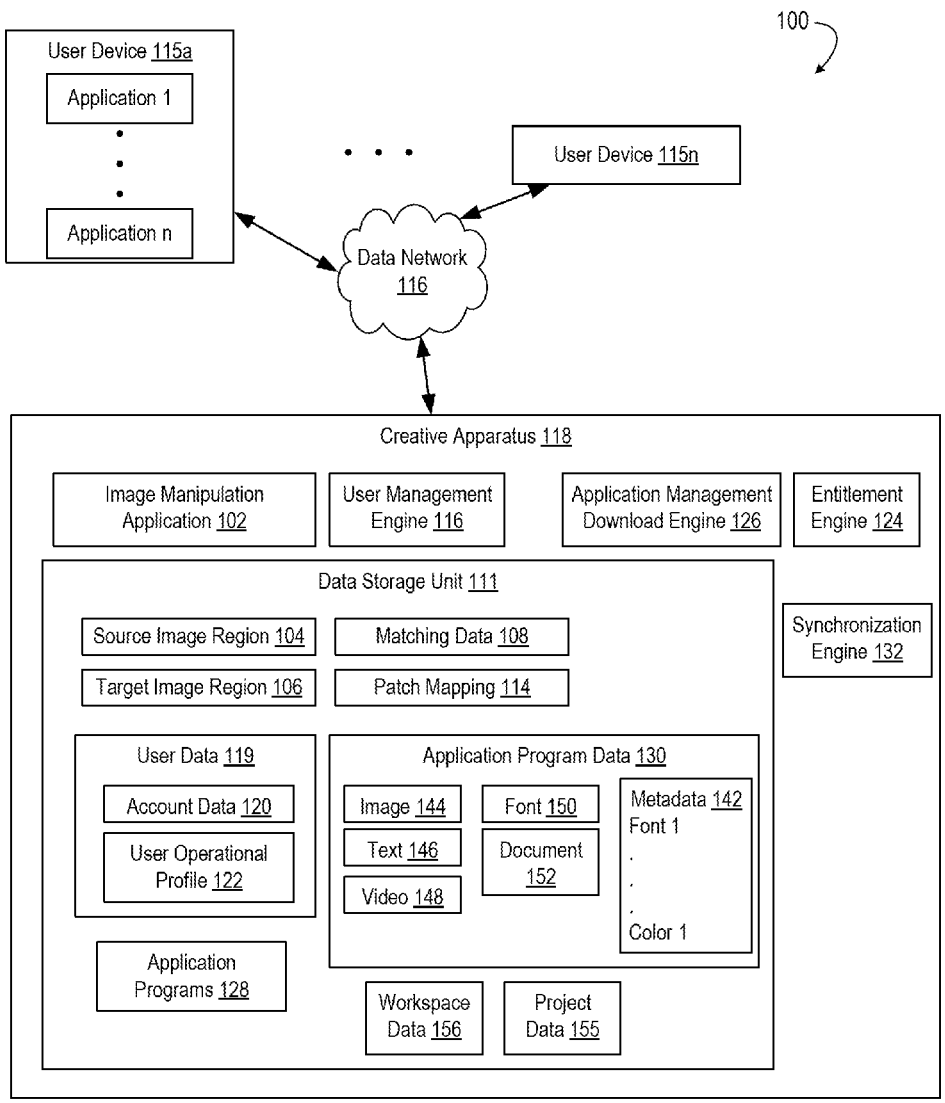
FIG. 1 is a diagram depicting an example of a network environment for using labels to track high-frequency offsets for patch-matching algorithms, according to certain embodiments.

The present disclosure includes systems and methods for using labels to track high-frequency offsets for a patch-matching algorithm, which identifies correspondences between patches in a source image region and patches in a target image region. An offset is a mapping from one image region to another image region that allows a comparison of image patches in the two image regions. In various examples, offsets are used for translation of one or more image patches, for rotation of one or more image patches, for reflection of one or more image patches, for scaling of one or more image patches, for perspective distortion of one or more image patches, for skewing of one or more image patches, and for non-linear warping of one or more image patches. As explained above, conventional solutions for propagating offsets through a source image in a patch-matching algorithm may inefficiently use computing resources. For example, in existing systems, propagation of offsets from source image patches to their adjacent neighbors can be disrupted by occluding objects, which may require certain offsets to be re-created in a resource-intensive manner rather than simply being copied (i.e., propagated) from one source image patch to another.

Certain embodiments described herein can propagate offsets more efficiently by tracking how frequently different offsets are used in the source image. In these embodiments, if the patch-matching algorithm attempts to find a similar target image patch for a given source image patch, the patch-matching algorithm can try one or more offsets that have been used more frequently by the patch-matching algorithm to match source image patches to training image patches. In some embodiments, when selecting a given offset, the patch-matching algorithm considers both this offset and its inverse as potential offsets for comparison of image patches. This selection of the high-frequency offset does not rely on propagating an offset from a neighboring image patch. Thus, the use of high-frequency offsets, as describe herein, allows offsets that are frequently used to find sufficiently similar target image patches to be, propagated throughout the source image even if occluding image objects r would otherwise disrupt propagation of offsets.

The following non-limiting example is provided to introduce certain embodiments. An image manipulation application executes a patch-matching algorithm using one or more tables, or other data structures, for tracking the frequency with which certain offsets are used. Each entry in a table includes a discrete label, or other identifier, that is specific to a given offset, as well as a description of the offset and frequency data for the offset. The frequency data indicates how many patches are mapped to sufficiently similar target images patches via the offset. For instance, a first entry in the table includes the label "O_1" that identifies a particular offset the offset description "(5,5)" indicating that the offset involves a movement of five pixels up and five pixels right, and a total number of patches using the offset labeled "O_1."

A second entry in the table includes the label "O_2," the offset description "(11,12)" indicating an offset of eleven pixels up and twelve pixels right, and a total number of patches using the offset labeled "O_2."

The image manipulation application uses a second table, or other data structure, to identify which image patches use each offset. This second table includes data identifying associations of image patches with specific offset labels. For instance, such a table may include entries showing that patches 1-5 of a source image region are associated with "O_1" and patches numbered 6-8 of the source image region are associated with "O_2." Each time a new association is created, the image manipulation application updates the frequency data with a total count of patches associated with a given offset label.

In some embodiments, the table of offset labels and associated frequency data enables dynamic, global tracking of correspondence information across a source image region as a patch-matching algorithm progresses. If the image manipulation application is searching for a target image patch that is similar to a given image patch, the image manipulation application uses the frequency data to select one or more offsets that are frequently used by the source image. For instance, 40% of the source image patches may be mapped to target image patches, and most mappings use "O_1" rather than "O_2." In this example, the image manipulation application selects a target image patch located at five pixels up and five pixels to the right (i.e., the offset specified for "O_1") from the source image patch under consideration. In this manner, "O_1" is propagated throughout the source image more quickly than would be the case if the patch-matching algorithm relied solely on propagation between adjacent patches. Furthermore, using the frequency information to propagate offsets to non-adjacent patches allows improved propagation of useful offsets even if a source image region includes one or more occluding objects, since selecting high-frequency offsets from an offset table does not require that the high-frequency offsets being used by a neighboring image patch.

Certain embodiments facilitate efficiencies in data storage when performing the patch-matching algorithm. For example, existing systems may store multiple pieces of data for each source image patch to identify a transformation between a source image patch and its corresponding target image patch. The multiple pieces of data can include a first vector element of the offset and a second vector element of the offset. In cases where a target image patch must be rotated and resized to match a source image patch, the pieces of data can also include information about the rotation and scaling operations. Thus, in existing systems, associating the same transformation with four source image patches would require storing four copies of the same set of transformation parameters. By contrast, some embodiments described herein will store the set of transformation parameters once in a description of an offset, associate the transformation parameters with a label, and simply associate image patches with the label.

Referring now to the drawings, FIG. 1 is a diagram depicting an example of a network environment 100 for using labels to track high-frequency offsets for patch-matching algorithms, according to certain embodiments. In the example depicted in FIG. 1, an image manipulation application 102 uses one or more patch-matching algorithms to find similarities between source image patches and target image patches. For example, the manipulation application 102 uses matching data 108 to generate a patch mapping 114 for a source image region 104 and a target image region 106.

Examples of operations performed by the patch matching algorithm are described herein with respect to FIG. 2-10. In some embodiments, the image manipulation application 102 is executed by a creative apparatus 118 using data stored on a data storage unit 111 (e.g., one or more of the source image region 104, the target image region 106, the matching data 108, and the patch mapping 114).

In some embodiments, the environment 100 includes user devices, such as user devices 115a-n. In some embodiments, the image manipulation application 102 is executed by the user device 115a, using data stored on a data storage unit (e.g., the data storage unit 111 storing one or more of the source image region 104, the target image region 106, the matching data 108, and the patch mapping 114), or data stored on another non-transitory computer-readable medium (e.g., a non-transitory computer-readable medium storing one or more of the source image region 104, the target image region 106, the matching data 108, and the patch mapping 114).

Each of the user devices 115a-n is connected to either a creative apparatus 11 via a network 116. A user of the user devices uses various products, applications, or services supported by the creative apparatus 118 via the network 116. Examples of the network 116 include, but are not limited to, internet, local area network ("LAN"), wireless area network, wired area network, wide area network, and the like.

The user devices 115a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 118. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer, tablet computer, a desktop computer, a processing unit, any combination of these devices, or any other suitable device having one or more processors.

Each user device includes at least one application supported by the creative apparatus 118. It is to be appreciated that following description is now explained using the user device 115*a* as an example and any other user device can be used.

The creative apparatus 118 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 118.

The creative apparatus 118 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 118 also includes a data storage unit 111. The data storage unit 111 can be implemented as one or more databases or one or more data servers. The data storage unit 111 includes data that is used by the image manipulation application 102 and other engines of the creative apparatus 118.

In some embodiments, a user of the user device 115*a* visits a webpage or an application store to explore applications supported by the creative apparatus 118 (e.g., the image manipulation application 102). The creative apparatus 118 provides the applications (e.g., the image manipulation application 102) as a software as a service ("SaaS"), or as a standalone application that can be installed on the user device 115*a*, or as a combination.

In some embodiments, the user creates an account with the creative apparatus 118 by providing user details and by creating login details. Alternatively, the creative apparatus 118 can automatically create login details for the user in response to receipt of the user details. In some aspects, the user is also prompted to install an application manager. The application manager enables the user to manage installation of various applications supported by the creative apparatus 118 and to manage other functionalities, such as updates, subscription account and the like, associated with the applications. The user details are received by a user management engine 116 and stored as user data 119 in the data storage unit 111. In some aspects, the user data 119 further includes account data 120 under which the user details are stored.

In some embodiments, the user either can opt for a trial account or can make payment based on type of account or subscription chosen by the user. Alternatively, the payment can be based on product or number of products chosen by the user. In some embodiments, based on payment details of the user, a user operational profile 122 is generated by an entitlement engine 124. The user operational profile 122 is stored in the data storage unit 111 and indicates entitlement of the user to various products or services. In some embodiments, the user operational profile 122 also indicates type of user, i.e. free, trial, student, discounted, or paid. In some embodiments, the user management engine 116 and the entitlement engine 124 can be one single engine performing the functionalities of both the engines.

In some embodiments, the user installs various applications supported by the creative apparatus 118 via an application download management engine 126. Application installers or application programs 128, which may include a copy of the image manipulation application 102 or other software usable with the image to perform operations described herein, are present in the data storage unit 111 and are fetched by the application download management engine 126. These application are made available to the user directly or via the application manager. In some embodiments, all application programs 128 are fetched and provided to the user via an interface of the application manager. In other embodiments, application programs 128 for which the user is eligible based on user's operational profile are displayed to the user. The user selects the application programs 128, which can include the image manipulation application 102, or the applications that the user wants to download. The application programs 128, which can include the image manipulation application 102, are downloaded on the user device 115*a* by the application manager via the application download management engine 126. Corresponding data regarding the download is also updated in the user operational profile 122. An application program 128 is an example of a digital tool. The application download management engine 126 also manages a process of providing updates to the user device 115*a*.

In some embodiments, upon download, installation and launching of an application program, the user is asked to provide the login details. A check is again made by the user management engine 116 and the entitlement engine 124 to ensure that the user is entitled to use the application program. In other embodiments, direct access is provided to the application program as the user is already logged into the application manager.

The user uses one or more application programs 128, which can include the image manipulation application 102, to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 111 by a synchronization engine 132. The application program data 130 can be specific to the user or can be shared with other users based on rights management.

In some embodiments, the application program data 130 includes one or more assets 140. The assets 140 can be a shared asset which the user wants to share with other users or which the user wants to offer on a marketplace. The assets 140 can also be shared across multiple application programs 128, which can include the image manipulation application 102. In some embodiments, each asset includes metadata 142.

In some embodiments, each asset also includes a file. Examples of the file include, but are not limited to, an image 144, text 146, a video 148, a font 150, a document 152, a combination of any of these, and the like. In another aspect, an asset only includes the metadata 142. The application program data 130 also include project data 154 and workspace data 156. In some embodiments, the project data 154 includes the assets 140. In additional or alternative embodiments, the assets 140 are standalone assets. Similarly, the workspace data 156 can be part of the project data 154 in some embodiments and may be standalone data in other embodiments.

In some embodiments, the user can have one, or more user devices (e.g., user devices 115*a-n*). The application program data 130 is accessible by the user from any device (e.g., device 115*b*), including a device that was not used to create the assets 140 (e.g., device 115*c*). This is achieved by the synchronization engine 132 that stores the application program data 130 in the data storage unit 111 and makes the application program data 130 available for access by the user or other users via any device. Before accessing the application program data 130 by the user from any other device or by any other user, the user or the other user may need to provide login details for authentication if not already logged in. Else, if the user or the other user is logged in then a newly created asset or updates to the application program data 130 are provided in real time. The workspace data 156 enables the synchronization engine 132 to provide same workspace configuration to the user on any other device or to the other user based on rights management data.

Figure 2:
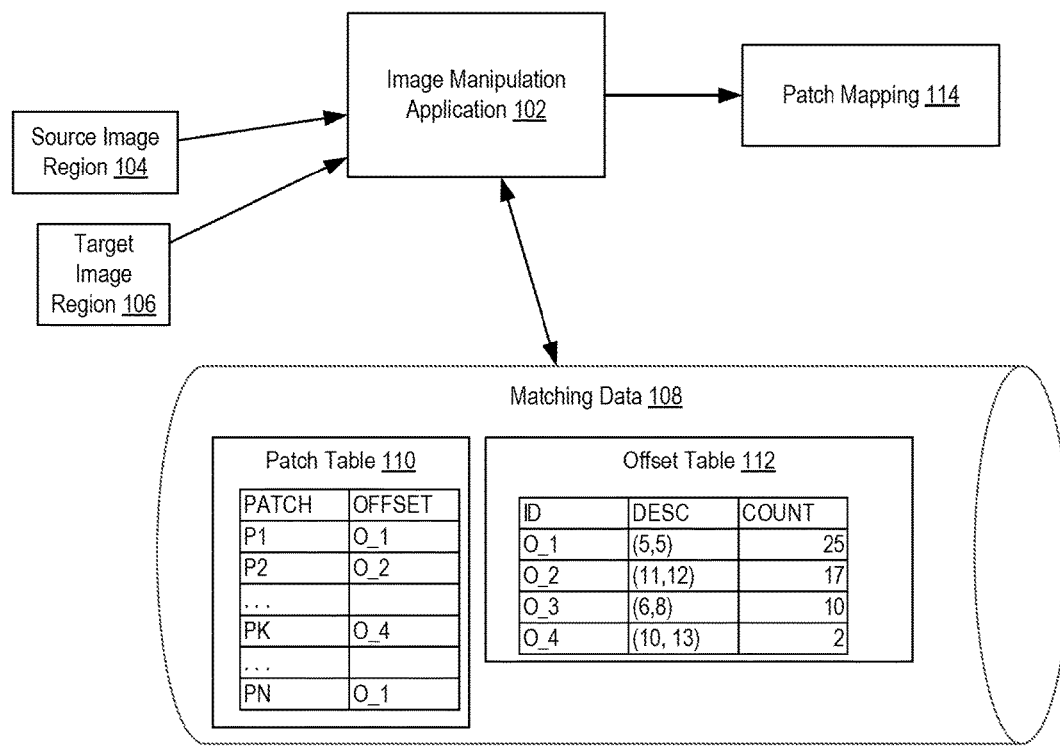
FIG. 2 is a diagram depicting a patch-matching process flow in which an image manipulation application uses a dynamically generated offset table to generate a patch mapping that maps image patches in a source image region to image patches in a target image region, according to certain embodiments.

FIG. 2 is a diagram depicting a patch-matching process flow in which an image manipulation application 102 generates a patch mapping 114. The patch mapping 114 maps image patches in a source image region 104 to image patches in a target image region 106. The image manipulation application 102 generates the patch mapping 114 using, at least in part, the matching data 108, as described in further detail herein with respect to FIG. 3.

The image manipulation application 102 includes program code that is executable by a processing device to perform one or more operations described herein. In some embodiments, the image manipulation application 102 is a stand-alone application. In other embodiments, the image manipulation application 102 includes one or more modules incorporated into another application. The image manipulation application 102 may be executed at one or more computing devices, which may be stand-alone computing devices, a set of computing devices configured for cloud computing or other distributed computing, or some combination thereof. (An example of a computing system that can execute the image manipulation application 102 is described herein with respect to FIG. 11.)

The matching data 108 includes any suitable data structure, such as (but not limited to) a database or other set of tables. In the example depicted in FIG. 2, the matching data 108 includes a patch table 110 that stores data about n different patches of a source image region 104. In the depicted example, the patch table 110 includes, at least, a field identifying an image patch (e.g. the set of patches "P1, P2, Pk . . . Pn") and a field identifying one or more offsets that are usable for transforming or otherwise mapping a given source image patch to a given target image patch. The offset labels (e.g., "O_1," "O_2," etc.) are used by the patch table 110 to identify different offsets. In the depicted example of a patch table 110, different patches may be associated with the same offset label.

The matching data 108 also includes an offset table 112 that stores data about offsets, where the offsets are used to map patches of the source image region 104 to the target image region 106. In the depicted example, each entry in the offset table 112 includes an offset label in the "ID" field that uniquely identifies a respective offset. Each entry in the offset table 112 also includes a description of the offset (e.g., "5, 5" indicating a movement of five pixels up and five pixels right with respect to a source image patch). Each entry in the offset table 112 also includes frequency data for the identified offset. The frequency data indicates how frequently a given one of the offsets is associated with different patches in the source image region 104. In one example, as depicted in FIG. 2, the frequency data is a count of the patches in the patch table 110 that are associated with the offset. For instance, the offset with the label "O_1" is associated with 25 of the patches listed in the patch table 110, the offset with the label "O_2" is associated with 17 of the patches listed in the patch table 110, and so on.

In some embodiments, using labels in the offset table 112 and the patch table 110 provides more efficient data storage as compared to solutions that lack patch labels. For instance, in the absence of the labels depicted in FIG. 2, associating a given image patch with an offset or other transform requires storing multiple pieces of data to identify a transformation (e.g., a translation, a rotation, a change in scale) etc. If the environment depicted in FIG. 2 lacked the patch labels from the offset table 112, the patch table would be required to store these multiple pieces of data for each image patch listed in the table. By contrast, using patch labels in the patch table 110 and the offset or transformation description in the offset table 112 allows the set, of transformation parameters to be stored once in a description of an offset and each patch to be associated with a label. Thus, the patch labels described herein can efficiently store information about offsets to be propagated.

In some embodiments, the image manipulation application 102 sorts the offset table 112 by the frequency data (e.g., in descending order of "Count" values). Sorting the offset table 112 by the frequency data allows the image manipulation application 102 to use the offset table 112 as a priority queue for different offsets, as described in detail with respect to FIG. 3.

Figure 3:
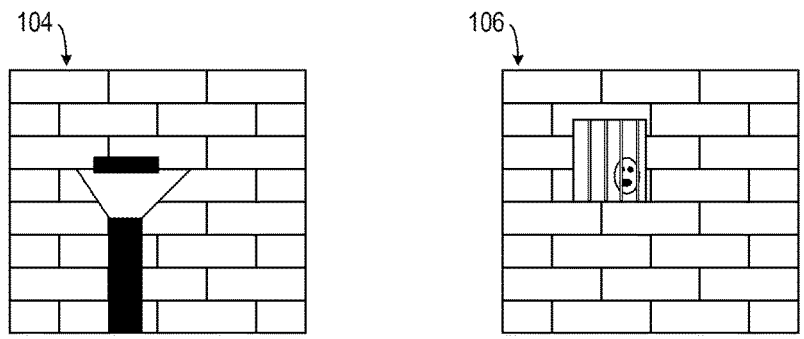
FIG. 3 is a diagram depicting simplified examples of a source image region and a target image region used by the patch-matching process, according to certain embodiments.

FIG. 3 depicts simplified examples, of the source image region 104 and the target image region 106. In this example, the source image region 104 depicts a brick wall with a lamp post in front of the wall, and the target image region 106 depicts a brick wall with a barred window having a face behind it. In some embodiments, the source image region 104 and the target image region 106 are portions of the same image file (e.g., an image of a prison having the lamp post and the barred window at different locations of the image). Regions of the same image can include dense subsets of the total number of pixels that make up the entire image. In additional or alternative embodiments, the source image region 104 and the target image region 106 are different images (e.g., an image of a school having the lamp post and an image of a prison having the barred window). In various embodiments, the source image region 104 and the target image region 106 are stored in any of a number of different formats, such as a pixel-based format in which the source image region 104 and the target image region 106 include the same or different numbers of pixels.

The image manipulation application 102 is used to determine or otherwise identify similarities between portions of the source image region 104 and portions of the target image region 106. The patch mapping 114 includes patch mapping data indicating that certain image patches in the source image region 104 correspond to (i.e., are similar to) certain image patches in the target image region 106. For example, the image manipulation application 102 is used to determine whether, for image content such as the brick wall in the source image region 104, the target image region 106 includes any corresponding image content, such as the brick wall portions in the target image region 106. This correspondence can indicate similarities between images (e.g., whether image content has any identical or closely resembling content). In some embodiments, the image manipulation application 102 or another suitable application uses this correspondence for one or more suitable image manipulation operations. Examples of image manipulation operations include image in-painting, stereo matching, texture synthesis, image synthesis, image retargeting, image summarization, and image or video manipulation.

Image regions, such as those depicted in FIGS. 2 and 3, can be defined using any suitable representation. Examples of these representations include gray-scale values, binary values, RGB/Lab/YIQ/YUV or any other color space values, gradients, texture filters, wavelets, or any other filter responses, optical flow (for video), surface normals (for shapes), volume occupancy (shapes), local histogram of quantized gradient orientations, local histogram of texture filters, any other common image/video/rasterized shape representation or any combination of these.

In some embodiments, one or more of the source image region 104, the target image region 106, and matching data 108 are stored on a computing device that executes the image manipulation application 102. In additional or alternative embodiments, one or more of the source image region 104, the target image region 106, and matching data 108 are accessed via a network by a computing device that executes the image manipulation application 102.

Figure 4:
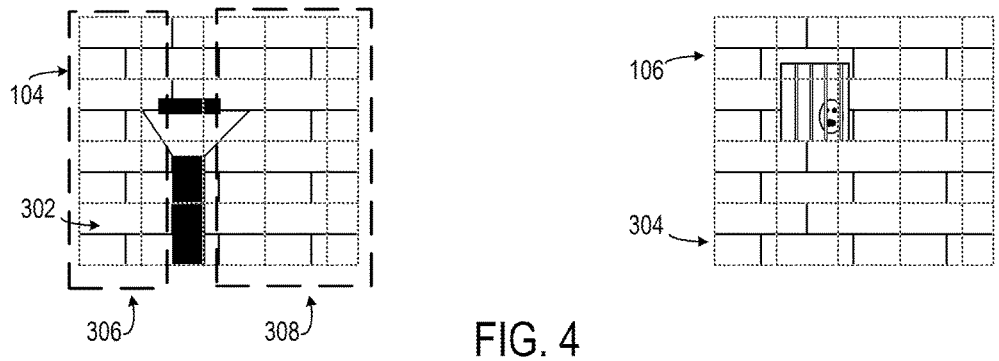
FIG. 4 is a diagram depicting simplified examples of patches in the source image region and target image region of FIG. 3, according to certain embodiments.

Each image region may include multiple image patches. FIG. 4 is a diagram depicting simplified examples of patches in the source image region 104 and the target image region 106. In this example, the patches are indicated by dotted lines, where each image patch (e.g., the source image patch 302 and the target image patch 304) is encompassed within the boundaries denoted by the dotted lines. For illustrative purposes, relatively large patches having regular shapes are depicted in FIG. 4. But an image patch of any size (e.g., 5×5 pixels) or even individual pixels may be used by the image manipulation application 102. An image patch may have a symmetrical shape (e.g., a square, a rectangle, etc.) or an asymmetrical or irregular shape.

In some embodiments, the image manipulation application 102 executes a patch-matching algorithm to generate a patch mapping 114. The patch mapping 114 maps one or more patches of pixels from the source image patch 302, which is in the source image region 104, to one or more sufficiently similar patches of pixels from the target image patch 304, which is in the target image region 106. In one example, the patch-matching algorithm involves scanning over different image patch windows (e.g., a source image patch 302 and a target image patch 304) of the source image region 104 and the target image region 106. The patch-matching algorithm compares pixel values in the source image patch and target image patch to compute a similarity score. An example of a similarity score is a sum-of-square distances ("SSD") between the pixel values in the source image patch and the target image patch, where identical patches will have an SSD of zero. For instance, in the example depicted in FIG. 4, a patch-matching algorithm could determine that the portion of a brick wall displayed in the source image patch 302 and the portion of a brick wall displayed in the target image patch 304 are identical or nearly identical based on a zero or near-zero SSD score for the two patches.

A patch-matching algorithm can use spatial coherence to propagate good matches. For instance, each match between a source image patch and a target image patch can be represented as a transform $T_i$ that maps one image patch location (e.g., a source image patch) to another image patch location (e.g., a target image patch). A "good" transform (e.g., an offset between two patches of sufficient similarity) can be found between two patches $P_x$ and $P_{\hat{x}}$, where x and $\hat{x}$ denote the pixel coordinates of the center of the source image patch and the target image patch, respectively (e.g., $P_{\hat{x}} \approx T_i(P_x)$). Propagating a "good" offset or other transform from a source image patch to a neighboring source image patch involves using the offset or other transform to select one or more candidate target image patches for comparison to the neighboring source image patch, comparing the selected candidate target image patches to the neighboring source image patch, and thereby determining that the propagated offset or other transform results in a sufficiently similar match for the neighboring source image patch.

In some cases, offsets or other transforms of nearby patches in a source image are often identical, due to the spatial coherency of the source and target images. Spatial coherency is a property in which, if a "good" transform is found between patches using a certain mapping, then moving this mapping a small amount in any direction will also produce an optimal match if the movement is sufficiently small. For example, source image patches $P_{x,1}$ and $P_{x,2}$ may be adjacent to one another, and target image patches $P_{\hat{x},1}$ and $P_{\hat{x},2}$ may be adjacent to one another. A transform $T_i$ (e.g., an offset) that results in matching a first source image patch $P_{x,1}$ with a first target image patch $P_{\hat{x},1}$ that is sufficiently similar to the first source image patch $P_{x,1}$. If spatial coherence is present in the two images, it is highly likely that the same transform $T_i$ will result in matching a second source image patch $P_{x,2}$ with a second target image $P_{\hat{x},2}$ that is sufficiently similar to the second source image patch $P_{x,2}$.

Although the spatial coherency can allow high-quality offsets or other transforms to be propagated between adjacent patches, the presence of occluding objects in a source image can prevent high-quality offsets or other transforms from being efficiently propagated throughout an image. For instance, in FIGS. 3 and 4, a regular pattern (e.g., a brick wall) includes amp post in the foreground. Propagation of if sets between adjacent patches may rapidly transport high-quality offsets or other transforms through an image portion 306 on the left half of the source image region 104 and through an image portion 308 on the right half of the source image region 104. But, if the image manipulation application 102 relies only on neighbor-to-neighbor propagation, these high-quality offsets or other transforms will not be efficiently propagated from the image portion 306 to the image portion 308 because of the occluding element (i.e., the lamp post). This is due to the fact that standard image patch match only propagates good transformations to adjacent neighbors.

The image manipulation application 102 uses the patch table 110 and the offset table 112 to propagate offsets or other transforms that are shared in common by many patches in the source image region 104. For instance, when using a patch-matching algorithm to match a source image patch to a target image patch, the image manipulation application 102 uses high-frequency offsets from the offset table 112 to identify potential target image patches for comparison with the source image patches. Selecting offsets from the offset table 112 enables global propagation of popular offsets or other transforms, in addition to the existing spatially local approach used by certain patch-matching algorithms.

Figure 5:
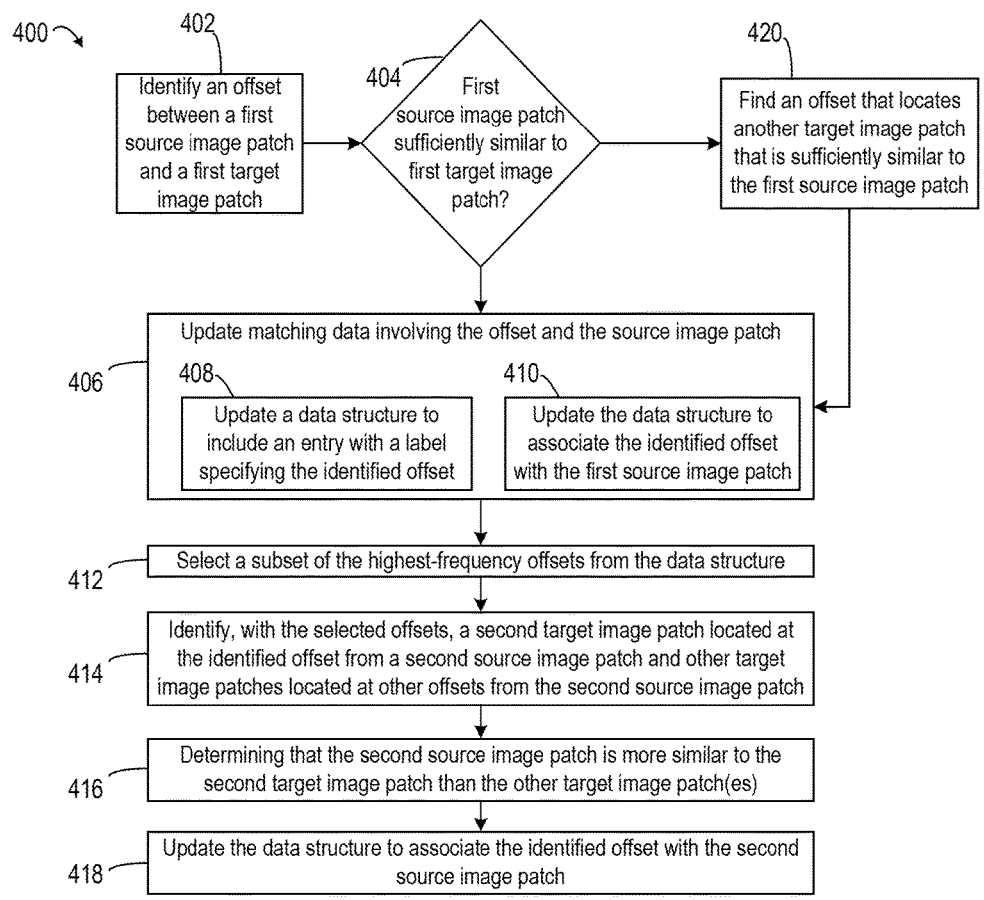
FIG. 5 is a flow chart depicting an example of a method for using image patch labels to track high-frequency offsets for patch-matching algorithms, according to certain embodiments.

FIG. 5 is a flow chart depicting an example of a method 400 for using labels to track high-frequency offsets for patch-matching algorithms. In some embodiments, one or more processing devices implement operations depicted in FIG. 5 by executing suitable program code (e.g., the image manipulation application 102). For illustrative purposes, the method 400 is described with reference to the examples depicted in FIGS. 2 and 4-11. Other implementations, however, are possible.

At block 402, method 400 involves identifying an offset between a first source image patch and a first target image patch. For instance, one or more processing devices can execute the image manipulation application 102 to access the source image region 104 and the target image region 106 and identify one or more offsets used to transform image patches from the source image region 104 into image patches from the target image region 106.

In some embodiments, the image manipulation application 102 accesses the source image region 104 and the target image region 106 from a non-transitory computer-readable medium local to the computing system that executes the image manipulation application 102. accessing the source image region 104 and the target image region 106 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the image manipulation application 102.

In additional or alternative embodiments, the image manipulation application 102 receives, via a data network, one or more of the source image region 104 and the target image region 106 from an imaging device or other computing device having a non-transitory computer-readable medium in which the source image region 104 and the target image region 106 are stored. Accessing the source image region 104 and the target image region 106 involves transmitting suitable electronic signals via a network interface device that communicatively couples, via a data network, a computing system that executes the image manipulation application 102 with another computing system that is communicatively coupled to the non-transitory computer-readable medium via a data bus or other form of local access. These signals cause at least some of the data from the non-transitory computer-readable medium to be transmitted over the data network, received via the network interface device of the computing system that executes the image manipulation application 102, and stored in a random-access memory or other memory device that allows rapid retrieval of data for processing operations performed by the computing system that executes the image manipulation application 102.

The image manipulation application 102 retrieves code, which is executable for performing the operations for identifying offsets, from a non-transitory computer-readable medium e.g., by communicating suitable signals to a non-transitory computer-readable medium via a data bus or a data network). The image manipulation application 102 then executes the retrieved code using the accessed image data.

Figure 6:
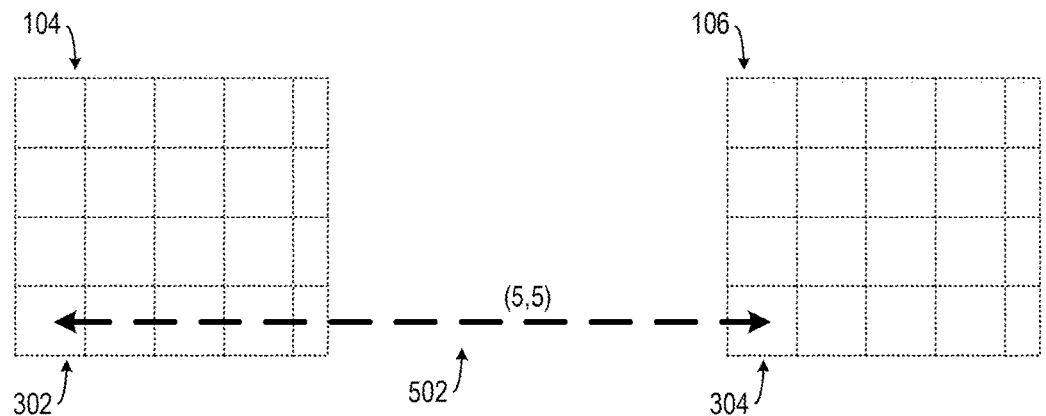
FIG. 6 is a diagram depicting a simplified example of identifying an offset between a source image patch and a target image patch in the method of FIG. 5, according to certain embodiments.

Executing the image manipulation application 102 involves a processing device (e.g., a processing device depicted in FIG. 11) performing one or more operations to analyze the access image data and identify an offset for the image data. For instance, FIG. 6 is a diagram depicting a simplified example of identifying an offset 502 between the source image patch 302 and the target image patch 304. (For ease of illustration, the diagram omits image content of the source image region 104 and the target image region 106.) In this example, the image manipulation application 102 identifies a target image patch 304 by searching at an image location in the target image region 106 that is offset by five pixels up from the source image patch 302 and five pixels to the right of the source image patch 302.

Any suitable operation or set of operations included in program code accessed by the processing device (e.g., the image manipulation application 102) can be executed by a patch-matching algorithm to identify an offset 502. Non-limiting examples of operations for identifying an offset can be found in U.S. Pat. No. 8,285,055 to Barnes et al., titled "Determining correspondence between image regions," which is incorporated by reference herein. For instance, in some embodiments, the image manipulation application 102 randomly selects the offset 502 using any location in the target image region 106. For instance, the patch-matching algorithm may include an initial search phase prior to identifying offsets for a majority of the patches in the source image region 104. In this initial search phase, the patch-matching algorithm uses a random offset value. If using, the randomly selected offset results in identifying a target image patch 304 that is sufficiently similar to the source image patch 302, the propagated offset is assigned to or otherwise associated with the source image patch 302.

In additional or alternative embodiments, the patch-matching algorithm includes one or more operations that propagate the offset 502 from another source image patch that is adjacent to or otherwise neighbors the source image patch 302. For instance, patch-matching algorithms may include one or more propagation operations in which, due to spatial coherency in the source image region, an offset from one image patch is propagated to an adjacent image patch. If using the propagated offset results in identifying a target image patch 304 that is sufficiently similar to the source image patch 302, the propagated offset is assigned to or otherwise associated with the source image patch 302.

In additional or alternative embodiments, the patch-matching algorithm randomly selects the offset value subject to a constraint on a distance from a previously identified target image patch. In one example, an offset value has been propagated the source image patch 302 from a neighboring source image patch, and the propagated offset value identifies a non-matching target image patch that is insufficiently similar to the source image patch 302. In this example, the image manipulation application 102 performs a random search within a spatial neighborhood of the non-matching target image patch to find a more suitable target image patch. The spatial neighborhood constrains the random search For instance, the image manipulation application 102 may randomly search within a neighborhood of four adjacent pixels in the same row or column, the surrounding eight pixels in the adjacent rows and, columns, etc. If a randomly selected target image patch 304 is sufficiently similar to the source image patch 302, then the image manipulation application 102 identifies the offset 502 between the source image patch 302 and the target image patch 304 as a useful offset.

Returning to FIG. 5, at block 404, the method 400 involves determining if the first source image patch is sufficiently similar to the first target image patch. For instance, one or more processing devices can execute the image manipulation application 102 to compute or otherwise determine a similarity between the first source image patch and the first target image patch.

Any suitable image-processing algorithm can be used to determine the similarity of two image patches. In one example, the image manipulation application 102 computers or otherwise identifies vectors representing a color gamut or other information about the two image patches. For instance, the image manipulation application 102 may identify a source vector corresponding to pixel values in the source image patch and a target vector corresponding to pixel values in the target image patch. The image manipulation application 102 determines a similarity between the image patches by computing a distance between these vectors (e.g., an SSD score). A larger distance indicates a lower degree of similarity, and a smaller distance indicates a higher degree of similarity. In some embodiments, the image manipulation application 102 determines that two image patches are sufficiently similar if the computed distance is less than a threshold distance.

Any suitable determination of similarity can be used. In some embodiments, a given target image patch is sufficiently similar to a source image patch if the target image patch is the most similar to the source image patch as compared to all target image patches. In other embodiments, a given target image patch is sufficiently similar to a source image patch if the target image patch is the most similar to the source image patch as compared to a selected subset of the available target image patches (e.g., a set of randomly selected target image patches, a set of target image patches in a specified area, etc.). In additional or alternative embodiments, a sufficiently similarity can be determined using any of the non-limiting examples of measurements of similarity for a PatchMatch algorithm, as described in Connelly Barnes et al., *PatchMatch: A Randomized Correspondence Algorithm for Structural image Editing*, ACM Transactions on Graphics (Proc. SIGGRAPH) 28(3), August 2009, which is incorporated by reference herein, and/or for a generalized PatchMatch algorithm, as described in Connelly Barnes et al., *The Generalized PatchMatch Correspondence Algorithm*, European Conference on Computer Vision, September 2010, which is incorporated by reference herein.

If the first source image patch is sufficiently similar to the first target image patch, the method 400 proceeds to block 406, which involves updating matching data involving the offset and the source image patch. For instance, one or more processing devices can execute the image manipulation application 102 to update the matching data 108. In some embodiments, block 406 includes blocks 408, 410.

At block 408, the method 400 involves updating a data structure to include an entry with a label specifying the identified offset. In one example, the image manipulation application 102 modifies an offset table 112 in the matching data 108 to include the identified offset modifying the offset table 112 involves creating or modifying a row or other record in the offset table 112 to include a label or other identifier of the offset (e.g., "O_1," "O_2," etc.) and a description of the offset "5, 5," "11, 12," etc.). A processing device that executes the method 400 can generate, update, or otherwise access any of these data structures by communicating suitable electronic signals via a data bus that communicatively couples the non-transitory computer-readable medium and the processing device, by communicating suitable electronic signals via a network interface device that communicatively couples the non-transitory computer-readable medium and the processing device, or some combination thereof.

At block 410, the method 400 involves updating the data structure to associate the identified offset with the first source image patch. In one example, the image manipulation application 102 modifies a patch table 110 in the matching data 108 to associate a given source image patch with a label or other identifier of a given offset. For instance, modifying the patch tab 110 may involve creating or modifying a row or other record in the patch table 110 to include an identifier of a given source image patch and a label of the offset that has been associated with the source image patch.

A processing device that executes the method 400 can perform block 410 by communicating suitable electronic signals via a data bus, that communicatively couples the non-transitory computer-readable medium and the processing device, by communicating suitable electronic signals via a network interface device that communicatively couples the non-transitory computer-readable medium and the processing device, or some combination thereof. For example, the processing device can communicate signals (e.g., via a data bus or data network) to access the data structure from a non-transitory computer-readable medium and to access program code for updating the ta structure to associate the identified offset with the first source image patch. The processing device can execute the program code for updating the data structure to associate the identified offset with the first source image patch. Executing the program code can cause the processing device to update the stored version of the data structure (e.g., one of the data structures identified above).

Figure 7:
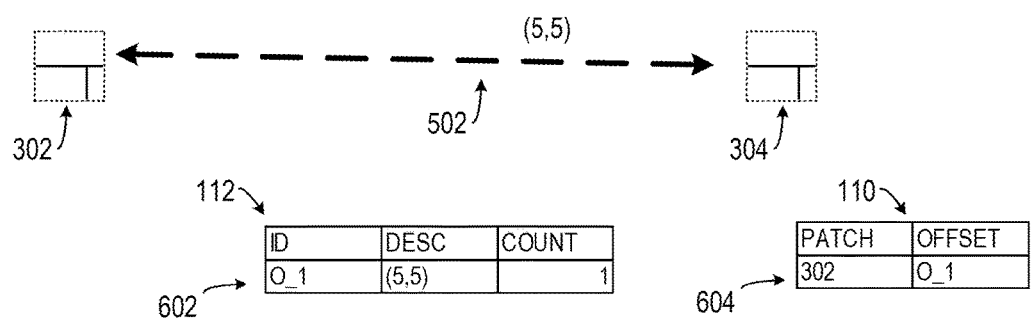
FIG. 7 is a diagram depicting a simplified example of updating the dynamically generated offset table of FIG. 2 using the offset identified in FIG. 6, according to certain embodiments.

A simplified example of operations performed at blocks 408 and 410 is depicted in FIG. 7. As indicated in FIG. 7, the source image patch 302 includes the same or similar image content as compared to the target image patch 304, which is offset from the s image patch 302 by the offset 502. The image manipulation application 102 updates the offset table 112 to create record, record, or other entry 602, which includes the label "O_1" and the description "5,5" (i.e., a movement of five pixels up and five pixels to the right) for the offset 502. The image manipulation application 102 also updates the patch table 112 to associate the source image patch 302 with the offset 502. The image manipulation application 102 creates this association by creating a record, record, or other entry 604 in the patch table 110. The image manipulation application 102 inserts the label for the offset 502 in the "Offset" field of entry 604. In this example, wen the offset 502 is added to the image patch table, only one source image patch (i.e., the source image patch 302) is associated with the offset 502. Thus, the image manipulation application 102 modifies the "Count" field for the offset 502 to reflect that one image patch is associated with the offset 502.

Returning to FIG. 5, at block 412, the method 400 involves selecting a subset of the highest-frequency offsets from the data structure. For example, the image manipulation application 102 is executed by one or more processing devices to select a subset of the highest-frequency offsets from the offset table 112 or another suitable data structure. The image manipulation application 102 can use any suitable process for selecting the subset of highest-frequency offsets. In some embodiments, the image manipulation application 102 selects the offsets having the highest ranks (i.e., the most frequently used offsets). In some embodiments, when selecting a given offset from the data structure, the image manipulation application 102 considers both this offset and its inverse as potential offsets for comparison of image patches. The one or more processing devices can access the highest-frequency offsets from a non-transitory computer-readable medium (e.g., by communicating appropriate signals via a data network or data bus).

Figure 8:
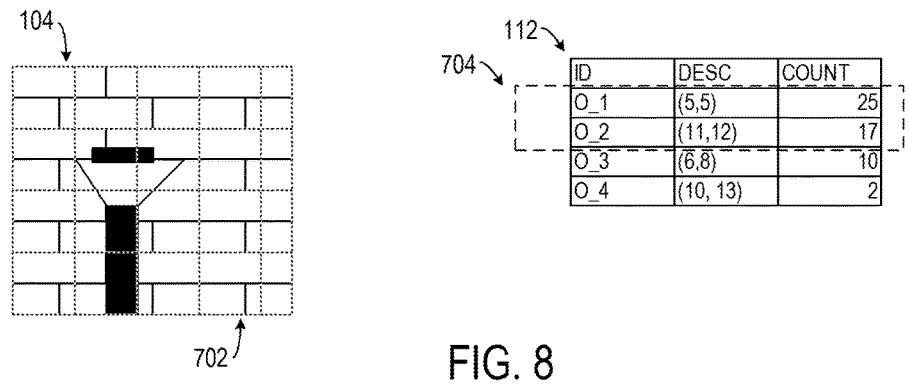
FIG. 8 is a diagram depicting a simplified example of selecting frequently used offsets for matching a target image patch to a source image patch in the method of FIG. 5, according to certain embodiments.

For instance, FIG. 8 is a diagram depicting a simplified example of selecting frequently used offsets for matching a target image patch to a source image patch. In this example, the image manipulation application 102 encounters the source image patch 702 when executing a patch-matching algorithm. The image manipulation application 102 accesses the offset table 112, or other suitable data structure, having data that indicates which offsets have been most frequently associated with the source image region 104. In the simplified example of FIG. 8, the offset table 112 identifies four different offsets, which are ranked in order of how many source image patches are associated with each offset (e.g., via the image patch table). The image manipulation application 102 selects a subset of the offsets. In this example, the selected subset 704 includes two highest-ranked offsets (i.e., offsets "O_1" and "O_2" associated with 25 source image patches and 17 source image patches, respectively).

In additional or alternative embodiments, the image manipulation application 102 selects certain offsets having sufficiently high ranks, but not necessarily the highest ranks. For instance, the image manipulation application 102 may identify the highest-ranked offsets (e.g., the top ten offsets that are most frequently used) and randomly select only some of those highest-ranked offsets (e.g., only the second-highest ranked and seventh highest ranked offsets).

Returning to FIG. 5, at block 414, the method 400 involves using the selected subset of high-frequency offsets to identify a second target image patch and or more other target image patches. The second target image patch is located at the identified offset from a second source image patch, and one or more other target image patches are located at one or more other offsets from the second source image patch. The image manipulation application 102 is executed by one or more processing devices to identify target image patches as candidates for comparison to a source image patch 702. The image manipulation application 102 identifies the target image patches that are positioned at locations offset from the source image patch 702 by the offsets in the selected subset of the highest-frequency offsets. The selected subset 704 of high-frequency offsets may include the offset 502 that was previously identified by the image manipulation application 102.

A computing system that executes the image manipulation application 102 can access the image data from a non-transitory computer-readable medium (e.g., by communicating suitable signals via a data bus or data network) and can execute suitable program code (e.g., the image manipulation application 102) having one or more functions for identifying one or more target patches, where at least one function uses the selected high-frequency offsets as an input.

Figure 9:
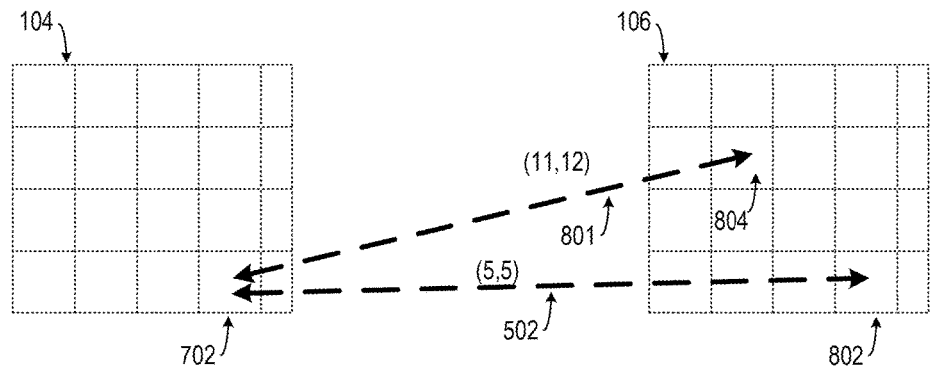
FIG. 9 is a diagram depicting a simplified example of identifying target image patches using the offsets selected in FIG. 8, according to certain embodiments.

FIG. 9 is a diagram depicting a simplified example of identifying target image patches using the selected subset 704 of high-frequency offsets. (For ease of illustration, FIG. 9 omits the image content of the source image region 104 and the target image region 106.) The image manipulation application 102 identifies a first target image patch 802 located at a position that is offset five pixels up from the source image patch 702 and five pixels to the right of the source image patch 702 (i.e., the offset 502 that is included in the selected subset 704). The image manipulation application 102 identifies a second target image patch 804 located at a position that is offset eleven pixels up from the source image patch 702 and twelve pixels to the right of the source image patch 702 (i.e., an offset 801 that is included in the selected subset 704).

Returning to FIG. 5, at block 416, the method 400 involves determining that the second source image patch is more similar to the second target image patch than the other target image patch (or patches). For instance, the image manipulation application 102 is executed by one or more processing devices to compute similarity scores between the each of the target image patches 802, 804 and the source image patch 702. The image manipulation application 102 can compute the similarity score in the same manner as described above with respect to block 404.

At block 418, the method 400 involves updating the data structure to associate the second source image patch with the entry for the identified offset. For instance, the image manipulation application 102 is executed by one or more processing devices to update the data structure, such as the patch table 110. In some embodiments, the image manipulation application 102 associates the second source image patch with the identified offset based on the second source image patch and the second target image patch being more similar to the second target image patch than one or more other target image patches that have been identified using the selected subset of high-frequency offsets.

Figure 10:
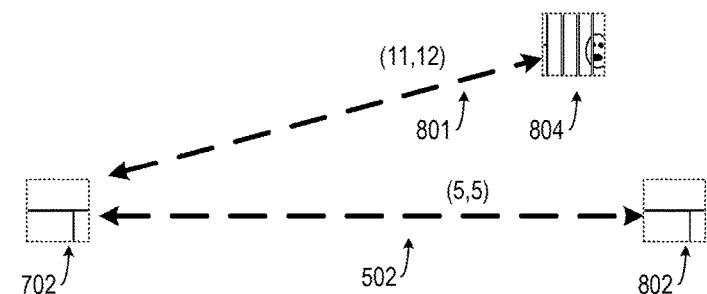
FIG. 10 is a diagram depicting a simplified example of associating the source image patch identified in FIG. 8 with an offset that identifies the most similar target image patch, according to certain embodiments.
Figure 10:
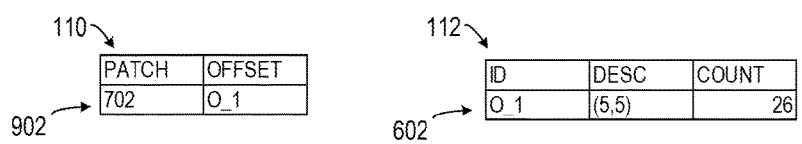

FIG. 10 depicts an example of the operations performed at blocks 416 and 418. As indicated in FIG. 10, the source image patch 702 includes the same or similar image content as compared to the target image patch 802 (e.g., a depiction of a brick wall), but includes different image content as compared to the target, image patch 804 (e.g., a brick wall versus a window with a face in it). The image manipulation, application 102 updates the patch table 112 to associate the source image patch 702 with the offset 502. The image manipulation application 102 creates this association by creating a record, record, or other entry 902 in the patch table 110. The image manipulation application 102 inserts the label for the offset 502 in the "Offset" field of entry 902.

In this example, the image manipulation application 102 also modifies the entry 602 to reflect the new association of the offset 502 with the source image patch 702. In particular, the image manipulation application 102 modifies the frequency information in entry 602 to increment the number of source image patches that are associated with the of 502.

Returning to FIG. 5, the method 400 proceeds to block 420 if the image manipulation application 102 determines at block 404 that the first source image patch is insufficiently similar to the first target image patch. Block 420 involves finding an offset that locates another target image patch that is sufficiently similar to the first source image patch. The image manipulation application 102 is executed by one or more processing device to perform block 420. The method 400 proceeds to block 406 if a sufficiently similar target image patch is found.

In some embodiments, the offset table 112 is dynamically generated or updated as a patch-matching algorithm is executed. For instance, after each source image patch is matched to a sufficiently similar target image patch, the image manipulation application 102 can create a new entry in the offset table 112 (e.g., if a new offset has been discovered) or update an existing entry in the offset table 112 (e.g., if a new association has been created between a previously identified offset and a source image patch).

In some embodiments, the image manipulation application 102 modifies the operation of a patch-matching algorithm based on the amount of data in the offset table (or other data structure used to track how frequently offsets are used). In one example, relatively few (e.g., 25% or less) of the image patches in a source image region 104 have been mapped to corresponding image patches in the target image region 106. In this example, the image manipulation application 102 uses nearest-neighbor propagation in combination with random selections of offset values (with or without distance constraints) to identify candidate target patches for comparison with a given source image patch. In these embodiments, the offset may be identified at block 402 using a random-selection process if fewer image patches than a threshold number of source image patches have been associated with respective offsets (e.g., via the patch table 110).

But, as the patch-matching algorithm progresses and a larger portion of the source image region 104 is mapped to the target image region 106, the image manipulation application nay decrease its reliance on random selections of offset values. In one example, most 75% or more) of the image patches in a source image region 104 have been mapped to corresponding image patches in the target image region 106. In this example, the image manipulation application 102 may omit random-selections and rely on a combination of the offset table 112 and nearest-neighbor propagation to identify candidate target patches for comparison with a given source image patch. In these embodiments, the subset of high-frequency offsets may be selected at block 412 if greater than the threshold number of source image patches have been associated with respective offsets (e.g., via the patch table 110).

In some embodiments, the image manipulation application 102 does not find a suitable target image patch that matches a given source image patch. For instance, even though the image manipulation application 102 uses a selected subset of high-frequency offsets to identify one or more candidate target image patches for comparison with the source image patch, one or more of these candidate target image patches may be insufficiently similar to the source image patch. In this scenario, the image manipulation application 102 uses one or more alternative offsets for locating one or more additional candidate target image patches. For instance, the image manipulation application 102 may propagate an offset from a neighboring source image patch to the source image patch under consideration, even if the propagated offset is not one of the highest-ranked offsets in the offset table 112. Additionally or alternatively, the image manipulation application 102 may randomly select an offset value by randomly identifying a target image patch from within a constrained neighborhood around another image patch that was identified using a high-frequency offset. The alternative offset (e.g. an offset identified through nearest-neighbor propagation or random search) may be used to identify a target image patch that is sufficiently similar to the source image patch under consideration.

Although FIGS. 1-10 are described using an example involving a single offset table 112, other implementations may be used. For instance, in some embodiments, the image manipulation application 102 segments a source image region based on semantic content of the source image region. An example of segmenting the source image region involves identifying color gamuts or other characteristic features of different segments of the source image region (e.g., reddish colors corresponding to the "brick wall" portions of source image region 104, grey or black colors corresponding to the "lamp post" portions of source image region 104, etc.). The image manipulation application 102 can generate and use different offset tables for different segments.

For instance, a first offset table may be generated, updated, and used to find candidate target image patches for source image patches in the first segment (e.g., source image patches with reddish color features. A second offset table may be generated, updated, and used to find candidate target image patches for source image patches in the second segment (e.g., source image patches with black or grey color features). In block 412, the image manipulation application 102 can identify which offset table is suitable for the segment that includes the source image patch under consideration. The image manipulation application 102 selects high-frequency offsets from the selected offset table.

In some embodiments, the image manipulation application 102 transmits or otherwise outputs data identifying one or more of the labels, the patching mapping, or any other data generated by the method 400. The image manipulation application 102 configures a presentation device, a network interface device, or another suitable output device to output this data at a computing device. Outputting the data can include configuring a display device to render visual representations of the labels or the image data for display, transmitting one or more messages via a data network that include data describing the labels or the image data, etc.

Figure 11:
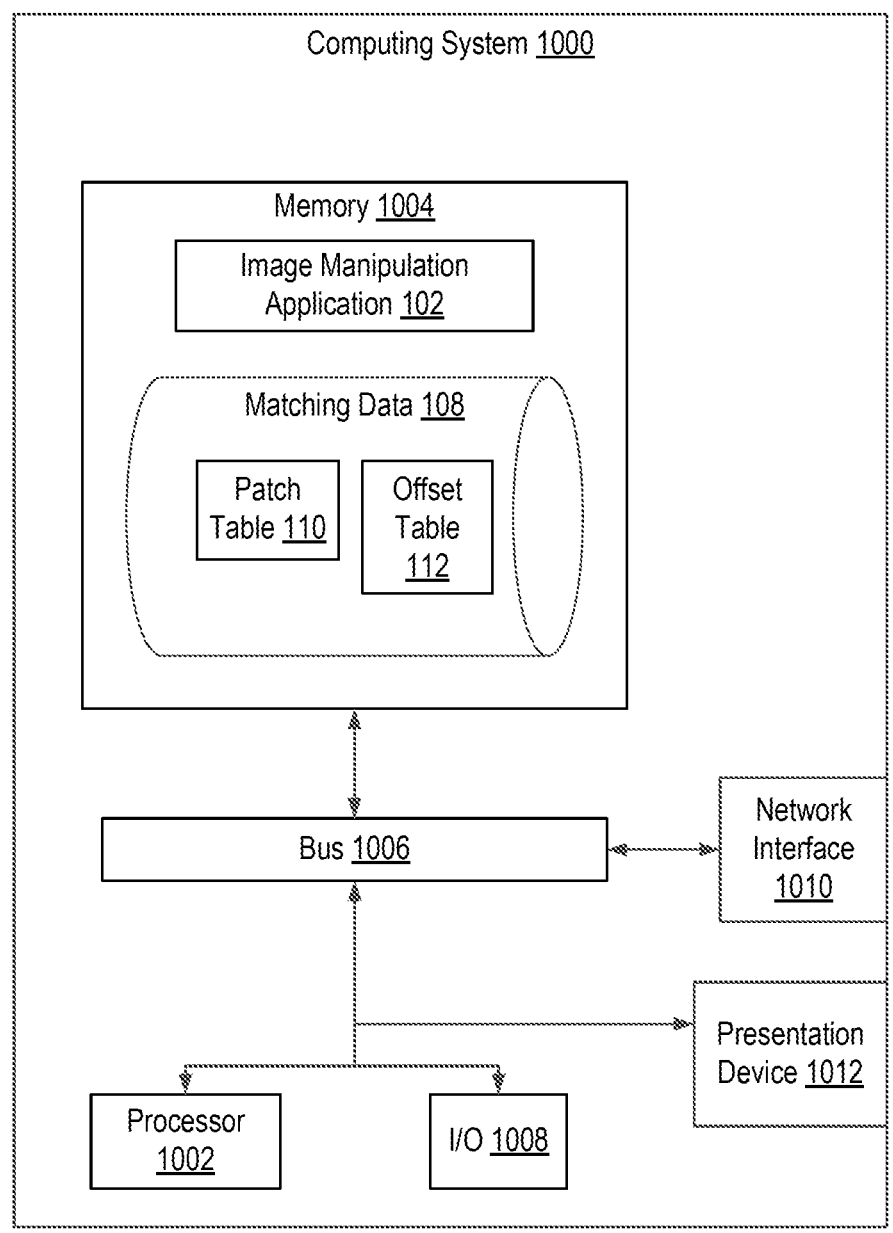
FIG. 11 is a block diagram depicting an example of a computing system that executes an image manipulation application for using a dynamically generated offset table to generate a patch mapping that maps image patches in a source image region to image patches in a target image region, according to certain embodiments.

Any suitable computing system or group of computing systems can be used for performing the operations described herein. For example, FIG. 11 is a block diagram depicting an example of a computing system 1000 that executes an image manipulation application 102 for using a dynamically generated offset table to generate a patch mapping that maps image patches in a source image region to image patches in a target image region, according to certain embodiments.

The depicted example of the computing system 1000 includes one or more processors 1002 communicatively coupled to one or more memory devices 1004. The processor 1002 executes computer-executable program code stored in the memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including one.

The memory device 1004 includes any suitable non-transitory computer-readable medium for storing the image manipulation application 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices such as input or output devices. For example, the computing system 1000 is shown with an input/output ("I/O") interface 1008 that can receive input from input devices or provide output to output devices. A bus 1006 can also be included in the computing system 1000. The bus 1006 can communicatively couple one or more components of the computing system 1000.

The computing system 1000 executes program code that configures the processor 1002 to perform one or more of the operations described above with respect to FIGS. 1-10. The program code includes, for example, the image manipulation application 102 or other suitable applications that perform one or more operations described herein. The program code may be resident in the memory device 1004 or any suitable computer-readable medium and may be executed by the processor 1002 or any other suitable processor. In some embodiments, the program code described above is stored in the memory device 1004, as depicted in FIG. 11. In additional or alternative embodiments, the program code described above is stored in one or more memory devices accessible via a data network.

The computing system 1000 can access one or more of the source image region 104, the target image region 106, and the matching data 108 in any suitable manner. In some embodiments, some or all of one or more of the source image region 104, the target image region 106, and the matching data 108 is stored, in the memory device 1004, as in the example depicted in FIG. 11. In additional or alternative embodiments, one or more of the source image region 104, the target image region 106, and the matching data 108 is stored in one or more memory devices accessible via a data network.

The computing system 1000 depicted in FIG. 11 also includes at least one network interface 1010. The network interface 1010 includes any device or group of devices suitable for establishing a wired or wireless data connection to one or more data networks. Non-limiting examples of the network interface 1010 include an Ethernet network adapter, a modem, and/or the like. The computing system 1000 is able to communicate with one or more other computing devices via a data network using the network interface 1010.

In some embodiments, the computing system 100 includes a presentation device 1012, as depicted in FIG. 11. A presentation device 1012 can include any device or group of devices suitable for providing visual, auditory, or other suitable sensory output. Non-limiting examples of the presentation device 1012 include a touchscreen, a monitor, a speaker, a separate mobile computing device, etc. In some embodiments, the image manipulation application 102 configures the presentation device 1012 to present one or more of the source image region 104, the target image region 106, and image processing results that are generated by applying one or more image manipulations to the this image content.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A system comprising:
    a non-transitory computer-readable medium storing a data structure and image patches;
    a processing device communicatively coupled to the non-transitory computer-readable medium, the processing device configured to access the data structure and the image patches stored in the non-transitory computer-readable medium,
    wherein the processing device is further configured to execute program code that, when executed by the processing device, configures the processing device to perform operations comprising:
        identifying an offset between a first source image patch and a first target image patch;
        adding, to the data structure, an entry with a label specifying the identified offset;
        associating, via the data structure, the first source image patch with the label, wherein the identified offset is included in a set of high-frequency offsets stored in the data structure;
        retrieving, from the data structure, (i) first frequency data indicating that the identified offset is associated with a first number of source image patches and (ii) second frequency data indicating that an additional offset is associated with a second number of source image patches;
        selecting, from the set of high-frequency offsets, the identified offset rather than the additional offset based on the first number of source image patches being larger than the second number of source image patches;
        identifying, using the identified offset selected from the set of high-frequency offsets, a second target image patch that is located at the identified offset from a second source image patch;
        determining that the second source image patch is sufficiently similar to the second target image patch; and
        based on the second source image patch and the second target image patch being sufficiently similar, associating, via the data structure, the second source image patch with the entry for the identified offset.

2. The system of claim 1, wherein the set of high-frequency offsets includes a stored offset;
    wherein the operations further comprise identifying a third target image patch that is located at the stored offset from the second source image patch;
    wherein determining that the second source image patch is sufficiently similar to the second target image patch comprises determining that a first similarity is greater than second similarity, wherein the first similarity is between the second source image patch and the second target image patch, wherein the second similarity is between the second source image patch and the third target image patch.

3. The system of claim 1, wherein the operations for identifying the offset between the first source image patch and the first target image patch comprises at least one of:
   randomly selecting the offset using any location in a target image region having a plurality of target image patches, the plurality of target image patches including the first target image patch and the second target image patch;
   propagating the offset to the first source image patch from a third source image patch that is adjacent to the first source image patch; or
   randomly selecting the offset from the target image region subject to a constraint on a distance from a previously identified target image patch.

4. The system of claim 3, wherein the offset is randomly selected based on determining, prior to identifying the offset, that fewer source image patches than a threshold number of source image patches have been associated with respective offsets; and
   wherein using the set of high-frequency offsets comprises selecting, as used high-frequency offsets, a subset of the high-frequency offsets based on determining, subsequent to identifying the offset, that more source image patches than the threshold number of source image patches have been associated with respective offsets.

5. The system of claim 1, the operations further comprising:
   identifying, using the set of high-frequency offsets, a third target image patch, wherein the third target image patch is located at the identified offset from a third source image patch;
   determining that the third target image patch is insufficiently similar to the third source image patch;
   identifying a propagated offset by propagating the propagated offset to the third source image patch from a fourth source image patch that is adjacent to the third source image patch;
   determining that a fourth target image patch, which is located at the identified propagated offset from the third source image patch, is sufficiently similar to the third source image patch; and
   updating the data structure with a second label, which specifies the identified propagated offset, and associating the third source image patch with the second label.

6. The system of claim 1, wherein the first and second source image patches are included in a plurality of source image patches from a source image:
   wherein the operations further comprise ranking offsets in the data structure according to how many source image patches have been associated with each of the offsets during an execution of a patch-matching algorithm for the source image;
   wherein the set of high-frequency offsets have the highest ranks.

7. The system of claim 1, wherein the first and second source image patches are included in a plurality of source image patches from a source image;
   wherein the operations further comprise:
   ranking offsets in the data structure according to how many source image patches have been associated with each of the offsets during an execution of a patch-matching algorithm for the source image; and
   identifying the highest-ranked offsets from the data structure, wherein using the set of high-frequency offsets comprises randomly selecting and using fewer than all of the highest-ranked offsets.

8. The system of claim 1, wherein determining that the first source image patch is sufficiently similar to the first target image patch and that the second source image patch is sufficiently similar to the second target image patch comprises, for each source image patch of the first and second source image patches and each target image patch of the first and second target image patches:
   identifying a respective source vector corresponding to pixel values in the source image patch and a respective target vector corresponding to pixel values in the target image patch;
   computing a respective distance between the respective source vector and the respective target vector; and
   determining that the source image patch is sufficiently similar to the target image patch based on the computed distance being less than a threshold distance.

9. The system of claim 1, wherein the first and second source image patches are included in a plurality of source image patches from a source image, wherein the operations further comprise:
   ranking offsets in the data structure according to how many source image patches have been associated with each of the offsets during an execution of a patch-matching algorithm for the source image; and
   re-ranking the offsets after associating the first source image patch with the identified offset.

10. A method comprising:
    identifying an offset between a first source image patch and a first target image patch;
    performing, based on the first source image patch being sufficiently similar to the first target image patch, operations involving the identified offset, the operations comprising:
       adding, to a data structure, an entry with a label specifying the identified offset, and
       associating, via the data structure, the first source image patch with the label, wherein the identified offset is included in a set of high-frequency offsets stored in the data structure;
    retrieving, from the data structure, (i) first frequency data indicating that the identified offset is associated with a first number of source image patches and (ii) second frequency data indicating that an additional offset is associated with a second number of source image patches;
    selecting, from the set of high-frequency offsets, the identified offset rather than the additional offset based on the first number of source image patches being larger than the second number of source image patches;
    identifying, using the identified offset selected from the set of high-frequency offsets, a second target image patch that is located at the identified offset from a second source image patch;
    determining that the second source image patch is sufficiently similar to the second target image patch; and
    associating, via the data structure and based on the second source image patch and the second target image patch being sufficiently similar, the second source image patch with the entry for the identified offset.

11. The method of claim 10, wherein the set of high-frequency offsets includes a stored offset;

wherein the method further comprises identifying a third target image patch that is located at the stored offset from the second source image patch;
wherein determining that the second source image patch is sufficiently similar to the second target image patch comprises determining that a first similarity is greater than second similarity, wherein the first similarity is between the second source image patch and the second target image patch, wherein the second similarity is between the second source image patch and the third target image patch.

12. The method of claim 10, wherein identifying the offset between the first source image patch and the first target image patch comprises at least one of:
randomly selecting the offset using any location in a target image region having a plurality of target image patches, the plurality of target image patches including the first target image patch and the second target image patch;
propagating the offset to the first source image patch from a third source image patch that is adjacent to the first source image patch; or
randomly selecting the offset from the target image region subject to a constraint on a distance from a previously identified target image patch.

13. The method of claim 12, wherein the offset is randomly selected based on determining, prior to identifying the offset, that fewer source image patches than a threshold number of source image patches have been associated with respective offsets; and
wherein using the set of high-frequency offsets comprises selecting, as used high-frequency offsets, a subset of the high-frequency offsets based on determining, subsequent to identifying the offset, that more source image patches than the threshold number of source image patches have been associated with respective offsets.

14. The method of claim 10, further comprising:
identifying, using the set of high-frequency offsets, a third target image patch, wherein the third target image patch is located at the identified offset from a third source image patch;
determining that the third target image patch is insufficiently similar to the third source image patch;
identifying a propagated offset by propagating the propagated offset to the third source image patch from a fourth source image patch that is adjacent to the third source image patch;
determining that a fourth target image patch, which is located at the identified propagated offset from the third source image patch, is sufficiently similar to the third source image patch; and
updating the data structure with a second label, which specifies the identified propagated offset, and associating the third source image patch with the second label.

15. The method of claim 10, wherein the first and second source image patches are included in a plurality of source image patches from a source image:
wherein the method further comprises ranking offsets in the data structure according to how many source image patches have been associated with each of the offsets during an execution of a patch-matching algorithm for the source image;
wherein the used high-frequency offsets have the highest ranks.

16. The method of claim 10, wherein the first and second source image patches are included in a plurality of source image patches from a source image;
wherein the method further comprises:
ranking offsets in the data structure according to how many source image patches have been associated with each of the offsets during an execution of a patch-matching algorithm for the source image; and
identifying the highest-ranked offsets from the data structure, wherein using the set of high-frequency offsets comprises randomly selecting and using fewer than all of the highest-ranked offsets.

17. A system comprising:
means for identifying an offset between a first source image patch and a first target image patch;
means for performing, based on the first source image patch being sufficiently similar to the first target image patch, operations comprising:
adding, to a data structure, an entry with a label specifying the identified offset, and
associating, via the data structure, the first source image patch with the label;
means for retrieving, from the data structure, (i) first frequency data indicating that the identified offset is associated with a first number of source image patches and (ii) second frequency data indicating that an additional offset is associated with a second number of source image patches;
means for selecting, from a set of high-frequency offsets that occur most frequently in the data structure, the identified offset rather than the additional offset based on the first number of source image patches being larger than the second number of source image patches;
means for identifying, using the identified offset selected from the set of high-frequency offsets, a second target image patch that is located at the identified offset from a second source image patch;
means for determining that the second source image patch is sufficiently similar to the second target image patch; and
means for associating, via the data structure, the second source image patch with the entry for the identified offset based on the second source image patch and the second target image patch being sufficiently similar.

18. The system of claim 17, wherein the set of high-frequency offsets includes a stored offset, wherein the system further comprises means for identifying a third target image patch that is located at the stored offset from the second source image patch, wherein determining that the second source image patch is sufficiently similar to the second target image patch comprises determining that a first similarity between the second source image patch and to the second target image patch is greater than a second similarity between the second source image patch and to the third target image patch.

19. The system of claim 17, wherein identifying the offset between the first source image patch and the first target image patch comprises at least one of:
randomly selecting the offset using any location in a target image region having a plurality of target image patches, the plurality of target image patches including the first target image patch and the second target image patch,
propagating the offset to the first source image patch from a third source image patch that is adjacent to the first source image patch; or
randomly selecting the offset from the target image region subject to a constraint on a distance from a previously identified target image patch.

20. The system of claim 19, further comprising:
means for randomly selecting the offset based on determining, prior to identifying the offset, that fewer source image patches than a threshold number of source image patches have been associated with respective offsets; and
means for selecting the set of high-frequency offsets based on determining, subsequent to identifying the offset, that more source image patches than the threshold number of source image patches have been associated with respective offsets.

* * * * *